US010977200B2

(12) United States Patent
Liu

(10) Patent No.: US 10,977,200 B2
(45) Date of Patent: Apr. 13, 2021

(54) METHOD, APPARATUS AND COMPUTER PROGRAM PRODUCT FOR PROCESSING I/O REQUEST

(71) Applicant: EMC IP Holding Company LLC, Hopkinton, MA (US)

(72) Inventor: Bing Liu, Tianjin (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/699,578

(22) Filed: Nov. 30, 2019

(65) Prior Publication Data

US 2020/0409878 A1 Dec. 31, 2020

(30) Foreign Application Priority Data

Jun. 27, 2019 (CN) ......................... 201910566737.2

(51) Int. Cl.
*G06F 13/16* (2006.01)

(52) U.S. Cl.
CPC ...... *G06F 13/1668* (2013.01); *G06F 13/1673* (2013.01)

(58) Field of Classification Search
CPC ......................... G06F 13/1668; G06F 13/1673
See application file for complete search history.

(56) References Cited

U.S. PATENT DOCUMENTS 7,188,219 B2 * 3/2007 Jeddeloh ............. G06F 13/1642 710/310
2005/0223131 A1 * 10/2005 Goekjian ................ G06F 13/28 710/22
2006/0242156 A1 * 10/2006 Bish ........................ H04L 69/14
2011/0082841 A1 * 4/2011 Christiaens ......... G06F 16/2365 707/692
2012/0221679 A1 * 8/2012 Yamamoto ............. G06F 5/065 709/217
2012/0331188 A1 * 12/2012 Riordan .................. G06F 3/061 710/33
2016/0011812 A1 * 1/2016 Amaki .................. G06F 3/0659 711/103
2016/0202909 A1 * 7/2016 Nguyen Tien ........ G06F 3/0604 711/103
2016/0231948 A1 * 8/2016 Gupta ..................... G06F 3/067
2018/0181186 A1 * 6/2018 Diefenbaugh ........ G06F 3/0625

* cited by examiner

*Primary Examiner* — Glenn A. Auve
(74) *Attorney, Agent, or Firm* — Chamberlain, Hrdlicka, White, Williams & Aughtry

(57) ABSTRACT

Embodiments of the present disclosure provide a method, an apparatus and a computer program product for processing an Input/Output (I/O) request. In one embodiment, a method for processing an I/O request comprises: receiving, at a host, a first I/O request of a first type for a storage device, wherein at least a first path configured for processing I/O requests of the first type and a second path configured for processing I/O requests of a second type exist between the host and the storage device; selecting, from the first path and the second path, a path for processing the first I/O request; and processing the first I/O request via the path.

13 Claims, 6 Drawing Sheets

METHOD, APPARATUS AND COMPUTER PROGRAM PRODUCT FOR PROCESSING I/O REQUEST

CROSS-REFERENCE TO RELATED APPLICATIONS

This application claims benefit to Chinese Patent Application 201910566737.2 filed on Jun. 27, 2019. Chinese Patent Application 201910566737.2 is hereby incorporated by reference in its entirety.

FIELD

Embodiments of the present disclosure generally relate to the field of data storage, and more specifically, to a method, an apparatus and a computer program product for processing an Input/Output (I/O) request.

BACKGROUND

Some storage systems have their own demands on scheduling of I/O requests. For example, in a storage system that supports de-duplication, read requests and write requests have significant asymmetry. The priority and number of read requests significantly exceed those of write requests. However, traditional I/O scheduling methods usually cannot adapt to the requirements of these storage systems and thus fail to provide satisfactory I/O service quality.

SUMMARY

Embodiments of the present disclosure provide a method, an apparatus and a computer program product for processing an I/O request.

In a first aspect of the present disclosure, there is provided a method for processing an I/O request. The method comprises: receiving, at a host, a first I/O request of a first type for a storage device, wherein at least a first path configured for processing I/O requests of the first type and a second path configured for processing I/O requests of a second type exist between the host and the storage device; selecting, from the first path and the second path, a path for processing the first I/O request; and processing the first I/O request via the path.

In a second aspect of the present disclosure, there is provided an apparatus for processing an I/O request. The apparatus comprises at least one processing unit and at least one memory coupled to the at least one processing unit and storing instructions for execution by the at least one processing unit. The instructions, when executed by the at least one processing unit, cause the apparatus to perform acts comprising: receiving, at a host, a first I/O request of a first type for a storage device, wherein at least a first path configured for processing I/O requests of the first type and a second path configured for processing I/O requests of a second type exist between the host and the storage device; selecting, from the first path and the second path, a path for processing the first I/O request; and processing the first I/O request via the path.

In a third aspect of the present disclosure, there is provided a computer program product. The computer program product is tangibly stored on a non-transient computer storage medium and comprises machine-executable instructions. The machine-executable instructions, when executed by a device, cause the device to execute any step of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

Throughout the drawings, the same or corresponding reference numerals indicate the same or corresponding parts.

DETAILED DESCRIPTION OF EMBODIMENTS

Figure 1A:
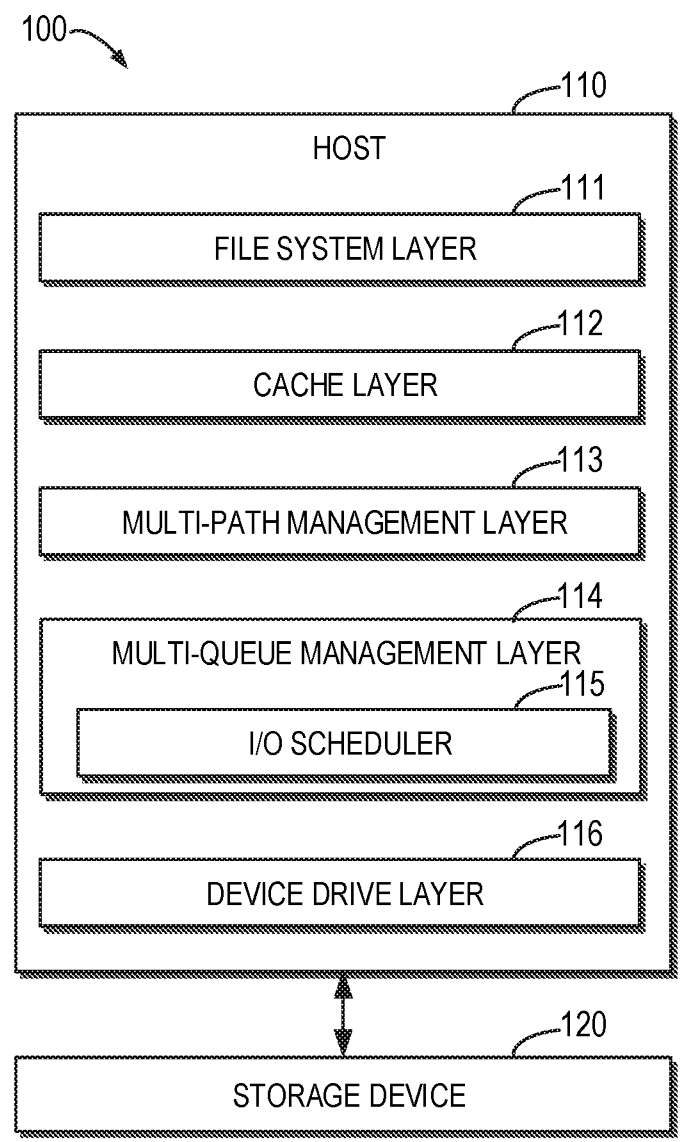
FIGS. 1A and 1B illustrate block diagrams of an example storage system in which embodiments of the present disclosure can be implemented.

Preferred embodiments of the present disclosure will be described in more details below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

As described above, some storage systems have their own demands on scheduling of I/O requests. For example, in a storage system that supports de-duplication, read requests and write requests have significant asymmetry. The priority and number of read requests significantly exceed those of write requests. However, traditional I/O scheduling methods usually cannot adapt to the requirements of these storage systems and thus fail to provide satisfactory I/O service quality.

For example, in some traditional I/O scheduling schemes, although multiple paths may exist between a host and a storage device, there is usually only one active path and the rest of the paths just play a fault tolerance role, which results in a waste of I/O processing bandwidth. Some conventional schemes statically configure a single path for processing read requests or write requests, or process I/O requests between different paths in turn regardless of types of the I/O requests. None of these schemes considers the asymmetry of read requests and write requests in the de-duplication storage system, which is likely to cause poor read processing performance and long latency. Besides, an I/O path in these schemes is often designed based on a single queue framework and cannot be extended to the newest multi-queue framework. That is, in these schemes, I/O requests for different data types are put into the same queue to wait for underlying processing. This would easily cause lock contention on the I/O path and further severely affect performance of the storage systems. The single queue framework cannot satisfy different quality requirements of I/O requests for different data types either.

Embodiments of the present disclosure provide a scheme for processing I/O requests to address one or more of the above problems and other potential problems. Different from the traditional I/O scheduling schemes, this scheme can provide a self-adaptive path selection policy to process read or write requests by considering asymmetry between read requests and write requests in the storage system. Besides, the scheme can operate across layers: first of all, a path for processing an I/O request is dynamically selected, at a multi-path management layer, from an I/O path configured for processing read requests and an I/O path configured for processing write requests based on statistical processing performance of historical I/O requests; and then, different service quality requirements of I/O requests for different data types can be satisfied by adjusting depths of different I/O queues for different data types.

In this way, the scheme can adapt to the requirements of the storage system where read requests and write requests are apparently asymmetrical, so as to provide better I/O service quality. For example, compared to the static path selection scheme, the scheme can take full advantage of the multi-path bandwidth. This scheme can implement the I/O path based on the multi-queue framework, which reduces the probability of lock contention on the I/O path. Besides, this scheme can satisfy different service quality requirements of I/O requests for different data types.

FIG. 1A illustrates a block diagram of an example storage system 100 where embodiments of the present disclosure can be implemented. As shown, the storage system 100 may include a host 110 and a storage device 120. It is to be understood that the structure and functionality of the example storage system 100 in FIG. 1A are illustrated only for the purpose of illustration, without suggesting any limitation to the scope of the present disclosure. Embodiments of the present disclosure can be implemented in an environment having different structure and/or functionality.

The host 110 can be any physical computer, virtual machine, server or so on. The storage device 120 can be implemented by any non-volatile storage media currently known or to be developed in the future, including but not limited to, a disk, a Solid-State Disk (SSD), a disk array or the like. An operating system and applications can run on the host 110. For example, the applications may initiate an I/O request (such as, read request or write request) for the storage device 120.

According to the path (also referred to as "I/O path" in the text) experienced by the I/O request in the host 110, the host 110 can be divided into a plurality of layers, where each layer represents a processing module through which the I/O request passes and the plurality of layers are also known as an I/O stack. As shown in FIG. 1A, the I/O stack in the host 110, for example, may include a file system layer 111, a cache layer 112, a multi-path management layer 113, a multi-queue management layer 114 and a device drive layer 116. For example, one I/O request can be initiated by an application running on the host 110. The initiated I/O request can be forwarded, split or merged via one or more layers and finally arrive at the storage device 120 managed by the device drive layer 116 to be processed and responded. It is to be understood that the I/O stack in the host 110 shown in FIG. 1A is only for the purpose of illustration, without suggesting any limitation to the scope of the present disclosure in any sense. In different embodiments, the I/O stack in the host 110 can be different.

Figure 1B:
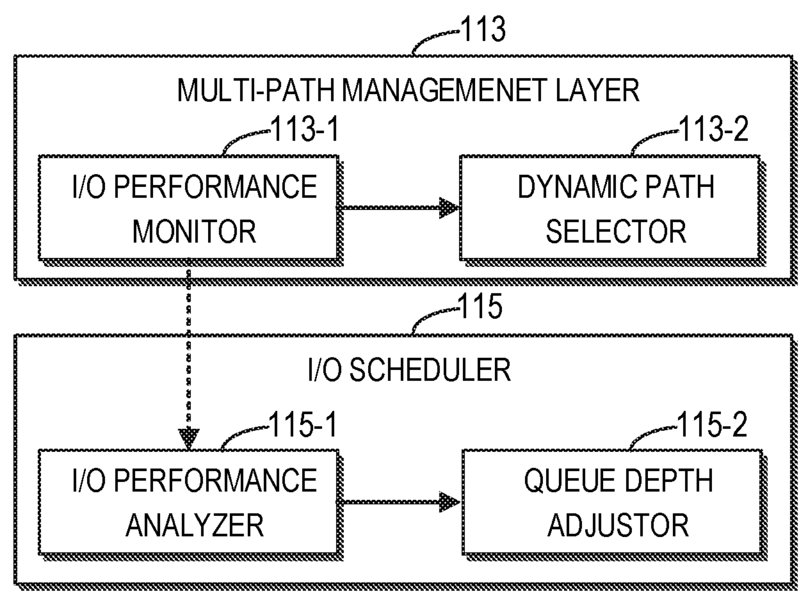

In some embodiments, the multi-path management layer 113 can be used for managing a plurality of I/O paths from the host 110 to the storage device 120. As shown in FIG. 1B, the multi-path management layer 113, for example, may include an I/O performance monitor 113-1 and a dynamic path selector 113-2. The I/O performance monitor 113-1 can monitor processing performance of each I/O request, such as response time (also known as "latency"), response speed and the like. Besides, the I/O performance monitor 113-1 can calculate the average processing performance (e.g., average response time, average response speed etc.) of different types of I/O requests (such as read requests or write requests) and can calculate the average processing performance of I/O requests processed by each I/O path. The I/O performance monitor 113-1 can provide the monitored and calculated result to the dynamic path selector 113-2, which can dynamically select, from a plurality of I/O paths, a path for processing a certain I/O request based on the received I/O performance monitoring results.

In some embodiments, the multi-queue management layer 114 can be employed for implementing a multi-queue based I/O scheduling strategy. According to FIG. 1A, the multi-queue management layer 114, for example, may include an I/O scheduler 115 configured to manage a plurality of I/O request queues for different data types. For example, the I/O scheduler 115 can add an I/O request, according to the data type for which the I/O request is directed, into a queue corresponding to the data type to wait for underlying processing. The depth of each queue corresponds to the number of I/O requests accommodated in the queue, which usually determines the throughput of the I/O requests processed via the queue.

As shown in FIG. 1B, the I/O scheduler 115, for example, may include an I/O performance analyzer 115-1 and a queue depth adjustor 115-2. The I/O performance analyzer 115-1 can acquire from the I/O performance monitor 113-1 information related to the processing performance of the I/O requests and execute a data type-specific I/O performance analysis based on the acquired information. For example, the I/O performance analyzer 115-1 may calculate the average processing performance of I/O requests for different data types in real time and provide the calculated result to the queue depth adjustor 115-2, which can dynamically adjust the depths of I/O request queues for different data types based on the received calculated result, so as to control service quality for I/O requests of different data types.

Figure 2:
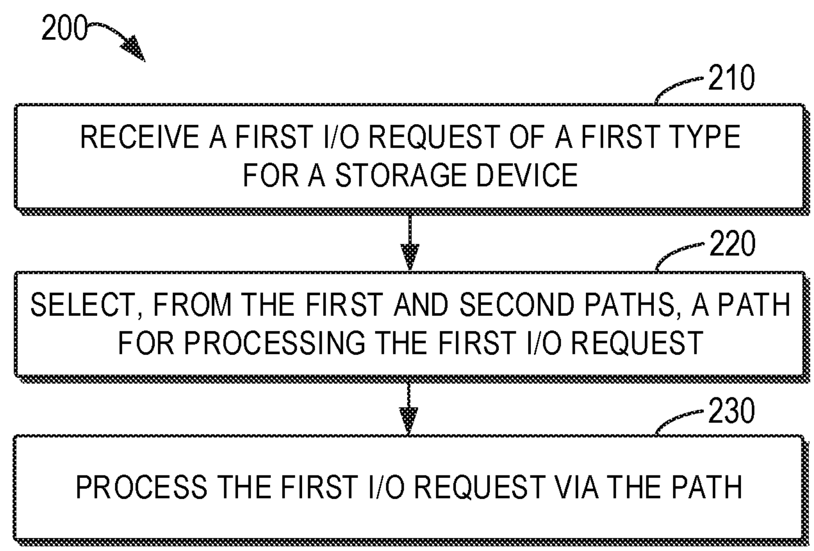
FIG. 2 illustrates a flowchart of an example method for processing an I/O request in accordance with embodiments of the present disclosure.

FIG. 2 illustrates a flowchart of an example method 200 for processing an I/O request in accordance with embodiments of the present disclosure. For example, the method 200 can be implemented by the host 110 (e.g., the multi-path management layer 113 therein). It is to be understood that the method 200 also can include additional acts not shown and/or omit some illustrated acts, and the scope of the present disclosure is not limited in this regard. The method 200 will be described below in details with reference to FIG. 1A and FIG. 1B.

As shown in FIG. 2, an I/O request of a first type for the storage device 120 is received by the host 110 at block 210. In some embodiments, at least a first path and a second path exist between the host 110 and the storage device 120, where the first path is configured for processing I/O requests of the first type while the second path is configured for processing I/O requests of a second type. In some embodiments, the I/O requests of the first type can be read requests while the I/O requests of the second type can be write requests. That is, the first path may be configured for processing read requests and the second path may be configured for processing write requests. Alternatively, in other embodiments, the I/O requests of the first type can be write requests while the I/O requests of the second type can be read requests. In other words, the first path may be configured for processing write requests and the second path may be configured for processing read requests. For the purpose of simplification and for convenience of description, a read request acts as an example of the I/O request of the first type and a write request acts as an example of the I/O request of the second type in the following text. It is to be understood that this is not intended to limit the scope of the present disclosure.

At block 220, the host 110 selects, from the first path and the second path, a path for processing the first I/O request. Then, at block 230, the host 110 processes the first I/O request via the selected path.

In some embodiments, the host 110 can select the first path to process the first I/O request by default. However, in some cases, read requests and write requests may have significant asymmetry in the system. For example, the priority and number of read requests significantly exceed those of write requests, such that the workload on a path (e.g., the first path) configured for processing the read request exceeds the workload on a path (e.g., the second path) configured for processing the write request. In some embodiments, when the workload on the first path exceeds the workload on the second path, the host 110 may select, based on the processing performance of historical I/O requests, a path for processing the first I/O request.

Figure 3:
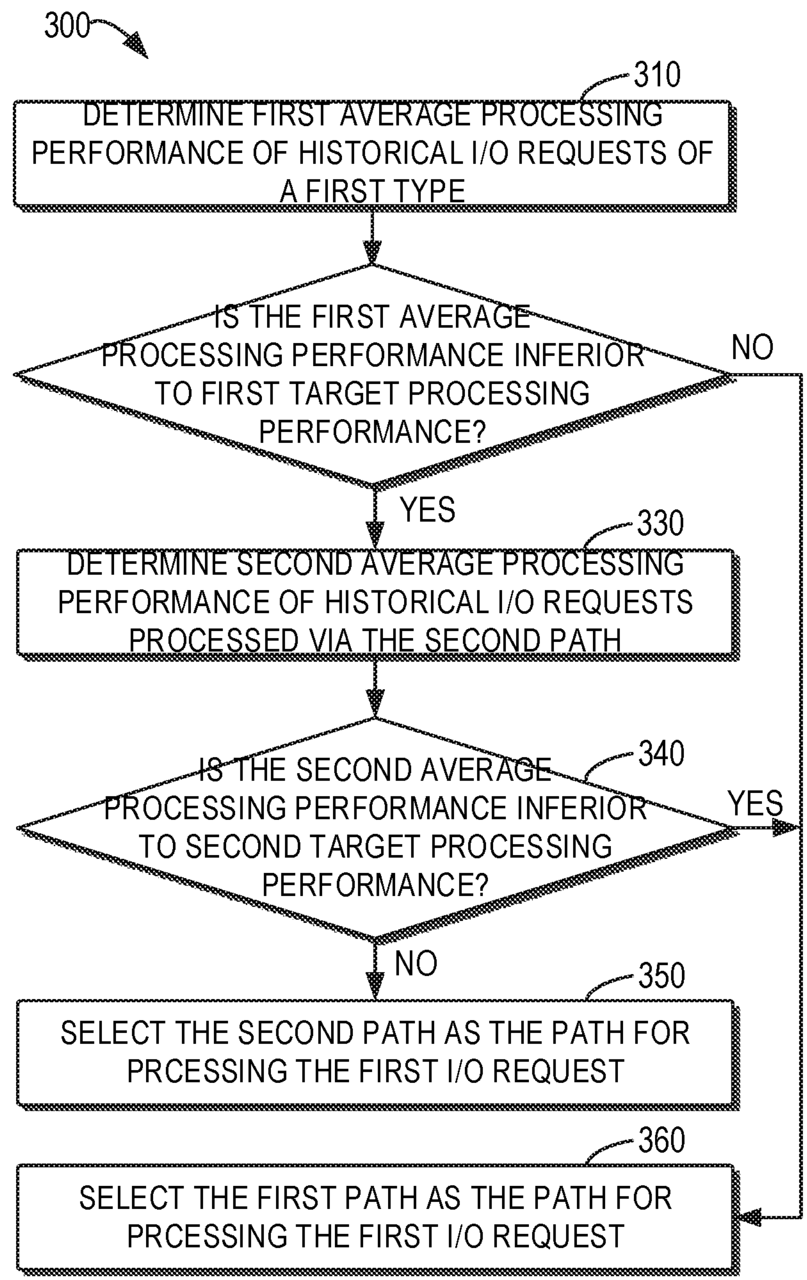
FIG. 3 illustrates a flowchart of an example method for selecting a path for processing an I/O request in accordance with embodiments of the present disclosure.

FIG. 3 illustrates a flowchart of an example method 300 of selecting a path for processing the I/O request in accordance with embodiments of the present disclosure. For example, the method 300 can be considered as an example implementation of the block 220 shown in FIG. 2.

As shown in FIG. 3, at block 310, the host 110 (e.g., the I/O performance monitor 113-1 shown in FIG. 1B) determines first average processing performance (such as average response time and average response speed etc.) of historical I/O requests of a first type (for example, historical read requests). At block 320, the host 110 determines, whether the first average processing performance is inferior to first target processing performance (for example, whether the average response time exceeds a target response time, whether the average response speed is below a target response speed, or the like). If the host 110 determines that the first average processing performance is superior to the first target processing performance (e.g., the average response time being lower than the target response time, the average response speed exceeding the target response speed, or so on), at block 360, the host 110 may still select the first path to process the first I/O request.

If the host 110 determines that the first average processing performance is inferior to the first target processing performance (e.g., the average response time exceeding the target response time, the average response speed being below the target response speed, or so on), the host 110 may further determine whether the second path is allowed for processing I/O requests of the first type. If the host determines that the second path is allowed for the I/O requests of the first type, the host 110 may select the second path to process the first I/O request.

In order to determine whether the second path is allowed for processing I/O requests of the first type, as shown in FIG. 3, at block 330, the host 110 may determine second average processing performance of historical I/O requests (e.g., including read requests and write requests) processed via the second path. At block 340, the host 110 may determine whether the second average processing performance is inferior to the second target processing performance. If the second average processing performance is inferior to the second target processing performance, the host 110 may determine that the I/O processing performance of the second path per se is poor and thus is not suitable for processing the I/O requests of the first type. Therefore, the method 300 proceeds to block 360, where the host 110 may still select the first path to process the first PO request. If the second average processing performance is superior to the second target processing performance, the host 110 may determine that the second path is suitable for processing the I/O requests of the first type. Therefore, at block 350, the host 110 may select the second path to process the first I/O request.

Through the above description, it can be seen that when the overall processing performance of the read requests is poor in the system, the host 110 can forward more read requests to the I/O path used for processing write requests, so as to process the read requests via the I/O path. When the overall I/O processing performance of the I/O paths for processing write requests drops to a certain level, the host 110 may switch to the default I/O path selection mechanism, i.e., allocating read requests to the I/O path for processing read requests and allocating write requests to the I/O path for processing write requests. Accordingly, the host 110 can dynamically select the I/O path to adapt to the requirements of the storage systems (such as, those storage systems enabling de-duplication) where the read requests and the write requests are apparently asymmetrical.

Figure 4:
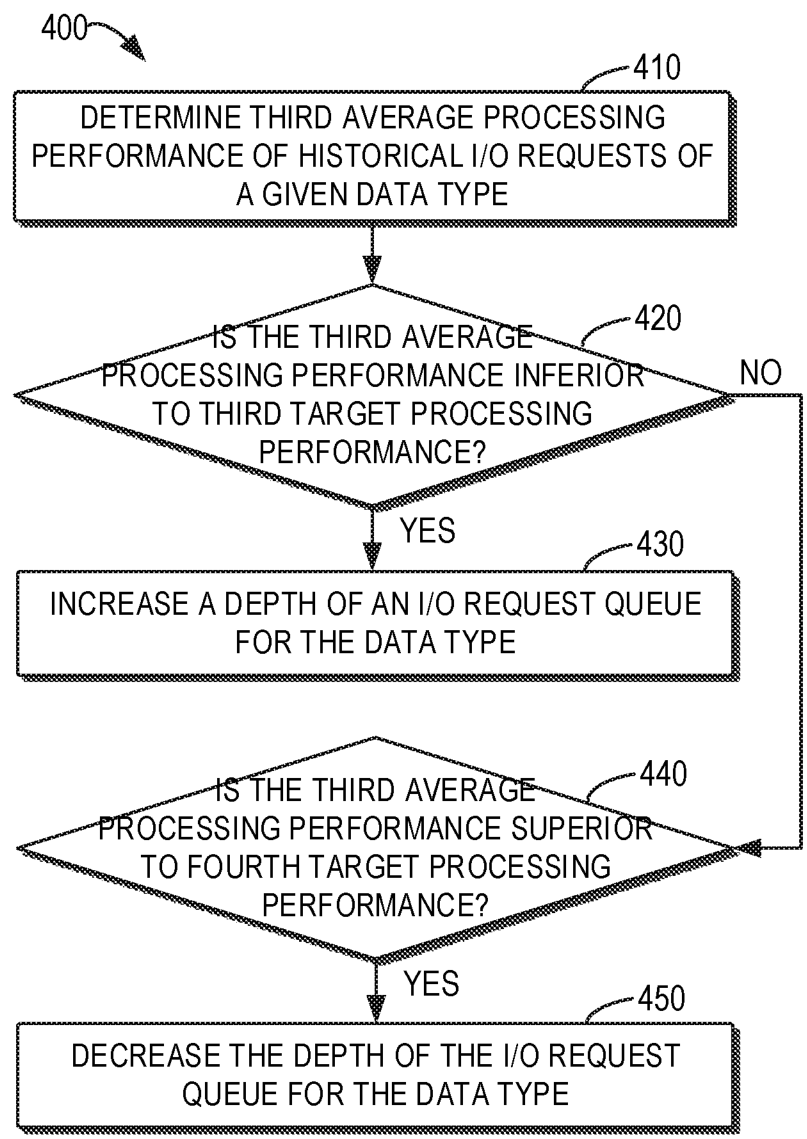
FIG. 4 illustrates a flowchart of an example method for adjusting a data type-specific I/O request queue in accordance with embodiments of the present disclosure.

FIG. 4 illustrates a flowchart of an example method 400 for adjusting a data type-specific I/O request queue in accordance with embodiments of the present disclosure. For example, the method 400 can be implemented at the host 110 (e.g., the I/O scheduler 115 therein). The method 400 can be executed subsequent to or in parallel with the method 200. In some embodiments, the method 400 can be executed periodically. It is to be understood that the method 400 can also include additional acts not shown and/or omit the illustrated acts, and the scope of the present disclosure is not limited in this regard. The method 400 will be described below with reference to FIGS. 1A and 1B.

At block 410, the host 110 (e.g., the I/O performance analyzer 115-1 shown in FIG. 1B) determines average processing performance (also referred to as "third average processing performance" in the text) of historical I/O requests of a given data type. The given data type can be any one of multiple data types (e.g., user data, various types of metadata and the like) that may exist in the storage system 100. For example, the I/O performance analyzer 115-1 can maintain a data structure for each data type, so as to record average processing performance and target processing performance (e.g., upper limit and lower limit) for I/O requests of each data type and a depth of a queue corresponding to the data type etc.

At block 420, the host 110 determines whether the third average processing performance is inferior to third target processing performance (e.g., lower limit of the target processing performance). If the third average processing performance is inferior to the third target processing performance (for example, the average response time exceeding an upper limit of the target response time, the average response speed being below a lower limit of the target response time, or the like), at block 430, the host 110 increases a depth of the I/O request queue for this data type, such that more I/O requests directed for the data type can be added into the queue, thereby improving the throughput of I/O requests for the data type.

In some embodiments, the host 110 may determine a step size for increasing the depth of the I/O request queue based on a difference between the third average processing performance and the third target processing performance. It is to be understood that the I/O requests of different data types may have same or different lower limits of the target processing performance. For example, the I/O requests of different data types can have various priorities, where the lower limit of the target processing performance for an I/O request of a higher priority may exceed that for another I/O request of a lower priority. For example, if the average averaging performance of historical I/O requests for both data types (such as data type A and data type B) is below the lower limit of their target processing performance, and the average processing performance of the I/O requests of data type A is worse than that of the I/O requests of data type B, the step size for increasing the depth of the I/O request queue for data type A can exceed the step size for increasing the depth of the I/O request queue for data type B.

If the third average processing performance is superior to the third target processing performance (for example, the average response time being below an upper limit of the target response time, the average response speed exceeding a lower limit of the target response time, or the like), at block 440, the host 110 may determines whether the third average processing performance is superior to fourth target processing performance (e.g., upper limit of the target processing performance). In some embodiments, the fourth target processing performance may be superior to the third target processing performance. Alternatively, in some embodiments, the fourth target processing performance can be identical to the third target processing performance (i.e., the target processing performance is a specific value instead of a scope). If the third target processing performance is superior to the fourth target processing performance (for example, the average response time being below a lower limit of the target response time, the average response speed exceeding an upper limit of the target response speed, or the like), at block 450, the host 11 decrease the depth of the I/O request queue of this data type, thereby reducing the throughput of I/O requests for the data type.

In some embodiments, the host 110 may determine a step size for decreasing the depth of the I/O request queue based on a difference between the third average processing performance and the fourth target processing performance. It should be understood that the I/O requests of different data types may have same or different upper limits of the target processing performance. For example, the I/O requests of different data types can have various priorities, where the upper limit of the target processing performance for an I/O request of a higher priority may exceed that for another I/O request of a lower priority. For example, if the average averaging performance of historical I/O requests for both data types (such as data type A and data type B) exceeds the upper limit of their target processing performance, and the average processing performance of the I/O requests of data type A is better than that of the I/O requests of data type B, the step size for decreasing the depth of the I/O request queue for data type A can exceed the step size for decreasing the depth of the I/O request queue for data type B.

In this way, the host 110 can dynamically adjust depths of the I/O request queues for different data types, so as to control service quality for the I/O requests of different data types.

Through the above description, it can be seen that embodiments of the present disclosure can adapt to the requirements of storage systems where read requests and write requests have significant asymmetry, so as to achieve better I/O service quality. For example, compared with the static path selection scheme, embodiments of the present disclosure can fully utilize the multi-path bandwidth. Embodiments of the present disclosure can implement the I/O path based on the multi-queue framework, which further lowers the probability of lock contention on the I/O path. Moreover, by using the multi-queue framework, embodiments of the present disclosure can satisfy different service quality requirements of the I/O requests of various data types.

Figure 5:
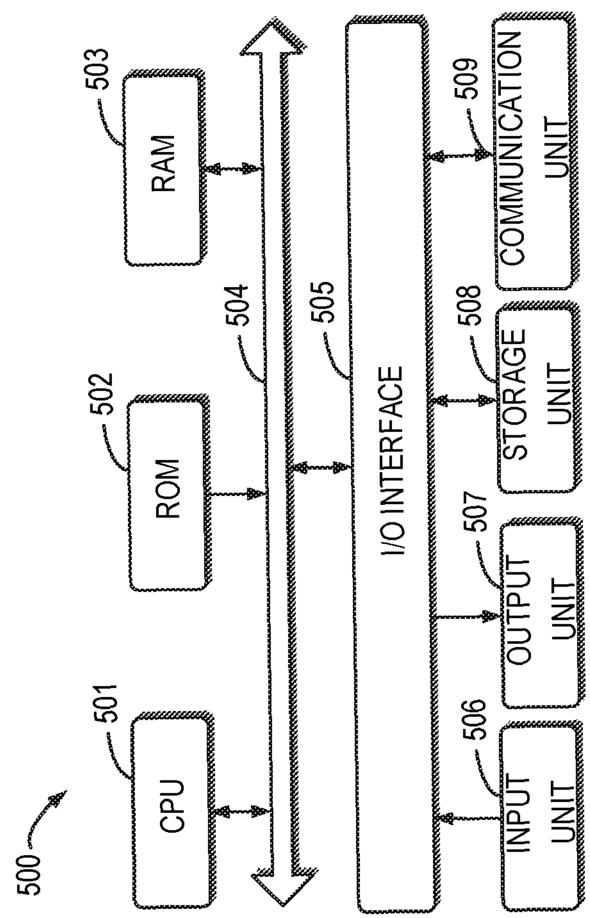
FIG. 5 illustrates a schematic block diagram of an example device for implementing embodiments of the present disclosure.

FIG. 5 illustrates a schematic block diagram of an example device 500 for implementing embodiments of the present disclosure. For example, the host 110 shown in FIG. 1 can be implemented by the device 500. As shown, the device 500 includes a central process unit (CPU) 501, which can execute various suitable actions and processing based on the computer program instructions stored in the read-only memory (ROM) 502 or computer program instructions loaded in the random-access memory (RAM) 503 from a storage unit 508. The RAM 503 can also store all kinds of programs and data required by the operations of the device 500. CPU 501, ROM 502 and RAM 503 are connected to each other via a bus 504. The input/output (I/O) interface 505 is also connected to the bus 504.

A plurality of components in the device 500 is connected to the I/O interface 505, including: an input unit 506, such as keyboard, mouse and the like; an output unit 507, e.g., various kinds of display and loudspeakers etc.; a storage unit 508, such as magnetic disk and optical disk etc.; and a communication unit 509, such as network card, modem, wireless transceiver and the like. The communication unit 509 allows the device 500 to exchange information/data with other devices via the computer network, such as Internet, and/or various telecommunication networks.

The above described each procedure and processing, such as method 200, 300 and/or 400, can also be executed by the processing unit 501. For example, in some embodiments, the method 200, 300 and/or 400 can be implemented as a computer software program tangibly included in the machine-readable medium, e.g., storage unit 508. In some embodiments, the computer program can be partially or fully loaded and/or mounted to the device 500 via ROM 502 and/or communication unit 509. When the computer program is loaded to RAM 503 and executed by the CPU 501, one or more steps of the above described method 200, 300 and/or 400 can be implemented.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable other ordinary skilled in the art to understand implementations of the present disclosure.

I claim:

1. A method for processing an Input/Output (I/O) request, comprising:

receiving, at a host, a first I/O request of a first type for a storage device, wherein at least a first path configured for processing I/O requests of the first type and a second path configured for processing I/O requests of a second type exist between the host and the storage device;

selecting, from the first path and the second path, a selected path for processing the first I/O request; and processing the first I/O request via the selected path, wherein a workload of the first path exceeds a workload of the second path, and wherein selecting the selected path comprises:

determining a first average processing performance of historical I/O requests of the first type;

in response to the first average processing performance being inferior to a first target processing performance:

determining whether the second path is allowed for processing I/O requests of the first type; and in response to the second path being allowed for processing I/O requests of the first type, selecting the second path as the selected path for processing the first I/O request.

2. The method of claim 1, wherein determining whether the second path is allowed for processing I/O requests of the first type comprises:

determining a second average processing performance of historical I/O requests processed via the second path;

in response to the second average processing performance being superior to a second target processing performance, determining that the second path is allowed for processing I/O requests of the first type; and in response to the second average processing performance being inferior to the second target processing performance, determining that the second path is prohibited from processing I/O requests of the first type.

3. The method of claim 1, wherein the I/O requests of the first type are read requests and the I/O requests of the second type are write requests.

4. The method of claim 1, wherein the I/O requests of the first type are write requests and the I/O requests of the second type are read requests.

5. The method of claim 1, wherein the selected path comprises a plurality of queues to process I/O requests for different data types, and wherein processing the first I/O request via the selected path comprises:

determining a determined data type of the different data types for which the first I/O request is directed;

determining, from the plurality of queues, a determined queue associated with the determined data type of the different data types; and adding the first I/O request into the determined queue.

6. The method of claim 5, further comprising:

determining a third average processing performance of historical I/O requests for the determined data type;

in response to the third average processing performance being inferior to third target processing performance, increasing a depth of the determined queue; and in response to the third average processing performance being superior to fourth target processing performance, decreasing the depth of the determined queue.

7. An apparatus for processing an Input/Output (I/O) request, comprising:

at least one processing unit;

at least one memory coupled to the at least one processing unit and storing instructions for execution by the at least one processing unit, the instructions, when executed by the at least one processing unit, causing the apparatus to perform acts comprising:

receiving, at a host, a first I/O request of a first type for a storage device, wherein at least a first path configured for processing I/O requests of the first type and a second path configured for processing I/O requests of a second type exist between the host and the storage device;

selecting, from the first path and the second path, a selected path for processing the first I/O request; and processing the first I/O request via the selected path, wherein a workload of the first path exceeds a workload of the second path, and wherein selecting the selected path comprises:

determining a first average processing performance of historical I/O requests of the first type;

in response to the first average processing performance being inferior to a first target processing performance:

determining whether the second path is allowed for processing I/O requests of the first type; and in response to the second path being allowed for processing I/O requests of the first type, selecting the second path as the selected path for processing the first I/O request.

8. The apparatus of claim 7, wherein determining whether the second path is allowed for processing I/O requests of the first type comprises:

determining a second average processing performance of historical I/O requests processed via the second path;

in response to the second average processing performance being superior to a second target processing performance, determining that the second path is allowed for processing I/O requests of the first type; and in response to the second average processing performance being inferior to the second target processing performance, determining that the second path is prohibited from processing I/O requests of the first type.

9. The apparatus of claim 7, wherein the I/O requests of the first type are read requests and the I/O requests of the second type are write requests.

10. The apparatus of claim 7, wherein the I/O requests of the first type are write requests and the I/O requests of the second type are read requests.

11. The apparatus of claim 7, wherein the selected path comprises a plurality of queues to process I/O requests for different data types, and wherein processing the first I/O request via the selected path comprises:

determining a determined data type for which the first I/O request is directed;

determining, from the plurality of queues, a determined queue associated with the determined data type; and adding the first I/O request into the determined queue.

12. The apparatus of claim 11, further comprising:

determining a third average processing performance of historical I/O requests for the determined data type;

in response to the third average processing performance being inferior to third target processing performance, increasing a depth of the queue; and in response to the third average processing performance being superior to fourth target processing performance, decreasing the depth of the determined queue.

13. A computer program product, which is tangibly stored on a non-transient computer storage medium and includes machine-executable instructions, the machine-executable instructions, when executed by a device, causing the device to execute a method, the method comprising:

receiving, at a host, a first I/O request of a first type for a storage device, wherein at least a first path configured for processing I/O requests of the first type and a second path configured for processing I/O requests of a second type exist between the host and the storage device;

selecting, from the first path and the second path, a selected path for processing the first I/O request; and processing the first I/O request via the selected path, wherein a workload of the first path exceeds a workload of the second path, and wherein selecting the selected path comprises:

determining a first average processing performance of historical I/O requests of the first type;

in response to the first average processing performance being inferior to a first target processing performance:

determining whether the second path is allowed for processing I/O requests of the first type; and in response to the second path being allowed for processing I/O requests of the first type, selecting the second path as the selected path for processing the first I/O request.

* * * * *